United States Patent
Katkar et al.

(10) Patent No.: US 10,442,268 B2
(45) Date of Patent: Oct. 15, 2019

(54) AXLE ASSEMBLY WITH TWIST BEAM

(71) Applicant: Mahindra N.A. Tech Center, Troy, MI (US)

(72) Inventors: Vidyadhar Vithal Katkar, Auburn Hills, MI (US); Matthew Thomas Brown, South Lyon, MI (US)

(73) Assignee: MAHINDRA N.A. TECH CENTER, Auburn Hills, MI (US)

( * ) Notice: Subject to any disclaimer, the term of this patent is extended or adjusted under 35 U.S.C. 154(b) by 175 days.

(21) Appl. No.: 15/625,256

(22) Filed: Jun. 16, 2017

(65) Prior Publication Data

US 2018/0361817 A1 Dec. 20, 2018

(51) Int. Cl.
B60G 21/05 (2006.01)

(52) U.S. Cl.
CPC ........ B60G 21/051 (2013.01); *B60G 2200/22* (2013.01); *B60G 2200/23* (2013.01); *B60G 2202/136* (2013.01); *B60G 2202/1362* (2013.01); *B60G 2206/20* (2013.01); *B60G 2206/811* (2013.01); *B60G 2206/8109* (2013.01)

(58) Field of Classification Search
CPC ................ B60G 21/051; B60G 21/055; B60G 2200/22; B60G 2202/136; B60G 2206/201; B60G 2206/20; B60G 2200/23; B62D 21/11
See application file for complete search history.

(56) References Cited

U.S. PATENT DOCUMENTS

| | | | | |
|---|---|---|---|---|
| 4,758,019 A * | 7/1988 | Tucker-Peake | ........ | B60G 11/04 280/124.109 |
| 5,409,254 A | 4/1995 | Minor et al. | | |
| 6,708,994 B2 * | 3/2004 | Etzold | ................... | B60G 7/001 280/124.106 |
| 7,566,063 B2 * | 7/2009 | Oki | ..................... | B60G 11/183 280/124.106 |
| 2017/0197487 A1 * | 7/2017 | Langworthy | ........... | B60B 35/00 |

FOREIGN PATENT DOCUMENTS

| | | | | |
|---|---|---|---|---|
| DE | 102015015520 A1 * | 6/2016 | ........... | B60G 21/055 |
| JP | 2009255763 A * | 11/2009 | ........... | B06G 21/051 |

* cited by examiner

*Primary Examiner* — Faye M Fleming (74) *Attorney, Agent, or Firm* — Harness, Dickey & Pierce, P.L.C.

(57) ABSTRACT

An axle assembly includes a first rail assembly, a second rail assembly and an open-section twist beam connected to the first rail assembly and the second rail assembly. The twist beam includes an upper wall, a lower wall and rear wall wherein the upper wall and the lower wall are connected by the rear wall to define an open portion of the twist beam where the upper wall and the lower wall are separated by a vertical distance. The open portion of the twist beam is forward facing. The axle assembly further includes a torsion bar that extends through and is connected within the open portion of the twist beam.

20 Claims, 8 Drawing Sheets

Fig-11

AXLE ASSEMBLY WITH TWIST BEAM

FIELD

The present disclosure relates to torsion beams and related structure used in axle assemblies and more particularly to torsion beams, torsion bars and the relative structure thereof that is used to obtain a desired torsional stiffness and a desired position of a shear center of axle assemblies.

BACKGROUND

This section provides background information related to the present disclosure which is not necessarily prior art.

Axle assemblies for vehicles include various structural elements in order to provide connection points for wheels, suspension and other chassis systems. The structural elements may include elements that are oriented transversely across a width of a vehicle. Such transversely oriented structural elements often require dedicated and expensive tooling to produce the complex shapes and sizes of such structural elements to deliver the loading, packaging and durability requirements of a vehicle to which it is attached. The unique designs of axle assemblies and the associated dedicated tooling make adjustments, tuning and scaling of the design difficult to complete quickly and inexpensively.

SUMMARY

This section provides a general summary of the disclosure, and is not a comprehensive disclosure of its full scope or all of its features.

In one example of the present disclosure, an axle assembly includes a first rail assembly, a second rail assembly and an open-section twist beam connected to the first rail assembly and the second rail assembly. The twist beam includes an upper wall, a lower wall and rear wall wherein the upper wall and the lower wall are connected by the rear wall to define an open portion of the twist beam where the upper wall and the lower wall are separated by a vertical distance. The open portion of the twist beam is forward facing. The axle assembly further includes a first outrigger connected to the first rail assembly on a first lateral outer wall of the first rail assembly and is connected at a location transversely outboard of the first end of the twist beam. The axle assembly also includes a second outrigger connected to the second rail assembly on a second lateral outer wall of the second rail assembly and is connected at a location transversely outboard of the second end of the twist beam. The axle assembly further includes a torsion bar that extends through and is connected to the first outrigger at a first bar attachment point and the second outrigger at a second bar attachment point. The torsion bar extends transversely within the open portion of the twist beam. A predetermined torsional stiffness and a predetermined position of a shear center of the axle assembly can be obtained based on the location of the first bar attachment point and the second bar attachment point relative to the twist beam.

In another aspect of the present disclosure, the rear wall of the twist beam includes a beam opening located opposite the open portion of the twist beam. The predetermined torsional stiffness and the predetermined position of the shear center of the axle assembly can be obtained and varied based on the length and height of the beam opening in the rear wall.

In another aspect of the present disclosure, the upper wall of the twist beam has a transversely extending upper forward edge. The upper forward edge may have an arcuate shape along a portion of the edge defining an upper scallop in the upper wall. The predetermined torsional stiffness and the predetermined position of the shear center of the axle assembly can be further obtained and varied based on the length and width of the upper scallop.

In another aspect of the present disclosure, the lower wall of the twist beam has a transversely extending lower forward edge. The lower forward edge may have an arcuate shape along a portion of the edge defining a lower scallop in the lower wall. The predetermined torsional stiffness and the predetermined position of the shear center of the axle assembly can be further obtained and varied based on the length and width of the lower scallop.

In another aspect of the present disclosure, the twist beam of the axle assembly is roll-formed with a C-channel configuration.

In another aspect of the present disclosure, the first bar attachment point is positioned at a transverse distance from the first end of the twist beam and at a depth relative to the rear wall of the twist beam. The predetermined torsional stiffness and the predetermined position of the shear center of the axle assembly can be further obtained and varied based on the transverse distance and the depth of the first bar attachment point.

In another aspect of the present disclosure, the torsion bar extends through the first rail assembly at a location transversely inboard of the first attachment point.

In an example method of the present disclosure, a method of producing an axle assembly with a predetermined torsional stiffness and a predetermined position of a shear center includes defining an initial set of twist beam physical parameters and an initial set of torsion bar physical parameters. The twist beam and the torsion bar physical parameters are varied to achieve the predetermined torsional stiffness and the predetermined position of the shear center of the axle assembly and obtain optimized twist beam physical parameters and optimized torsion bar physical parameters. The method further includes connecting a first end of a twist beam including the optimized twist beam physical parameters to a first rail assembly and connecting a second end of the twist beam to a second rail assembly. The twist beam includes an upper wall and a lower wall connected and separated by a rear wall to create an open portion between the upper wall and the lower wall. The method further includes connecting a first outrigger to the first rail assembly at a location transversely outboard of the first end of the twist beam on a lateral outer wall of the first rail assembly. The method also includes connecting a second outrigger to a second rail assembly transversely outboard of the second end of the twist beam on a lateral outer wall of the second rail assembly. The method also includes connecting a torsion bar including the optimized torsion bar physical parameters to the first outrigger and the second outrigger such that the torsion bar spans the transverse distance between the first outrigger and the second outrigger. The torsion bar is positioned between the upper wall and the lower wall of the twist beam at a desired location to obtain the predetermined torsional stiffness and the predetermined position of the shear center of the axle assembly.

In another aspect of the present disclosure, a method of producing an axle assembly further includes removing a portion of the upper wall of the twist beam such that a forward edge of the upper wall has an arcuate shape along a portion of the forward edge of the upper wall between the first end and the second end of the twist beam wherein the length and width of the upper scallop are chosen to obtain the predetermined torsional stiffness and the predetermined position of the shear center of the axle assembly.

In another aspect of the present disclosure, a method of producing an axle assembly further includes removing a portion of the rear wall of the twist beam to create a pass-through opposite the open portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, and/or sections, these elements, components, regions, and/or sections should not be limited by these terms. These terms may be only used to distinguish one element, component, region or section from another region or section. Terms such as "first," "second," and other numerical terms when used herein do not imply a sequence or order unless clearly indicated by the context. Thus, a first element, component, region, layer or section discussed below could be termed a second element, component, region, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device or assembly in the figures is turned over, elements described as "lower" or "beneath" other elements or features would then be oriented "above" the other elements or features. Thus, the example term "lower" can encompass both an orientation of above and below. The device or assembly may be otherwise oriented (rotated 90 degrees or at other orientations) and the spatially relative descriptors used herein interpreted accordingly.

Figure 1:
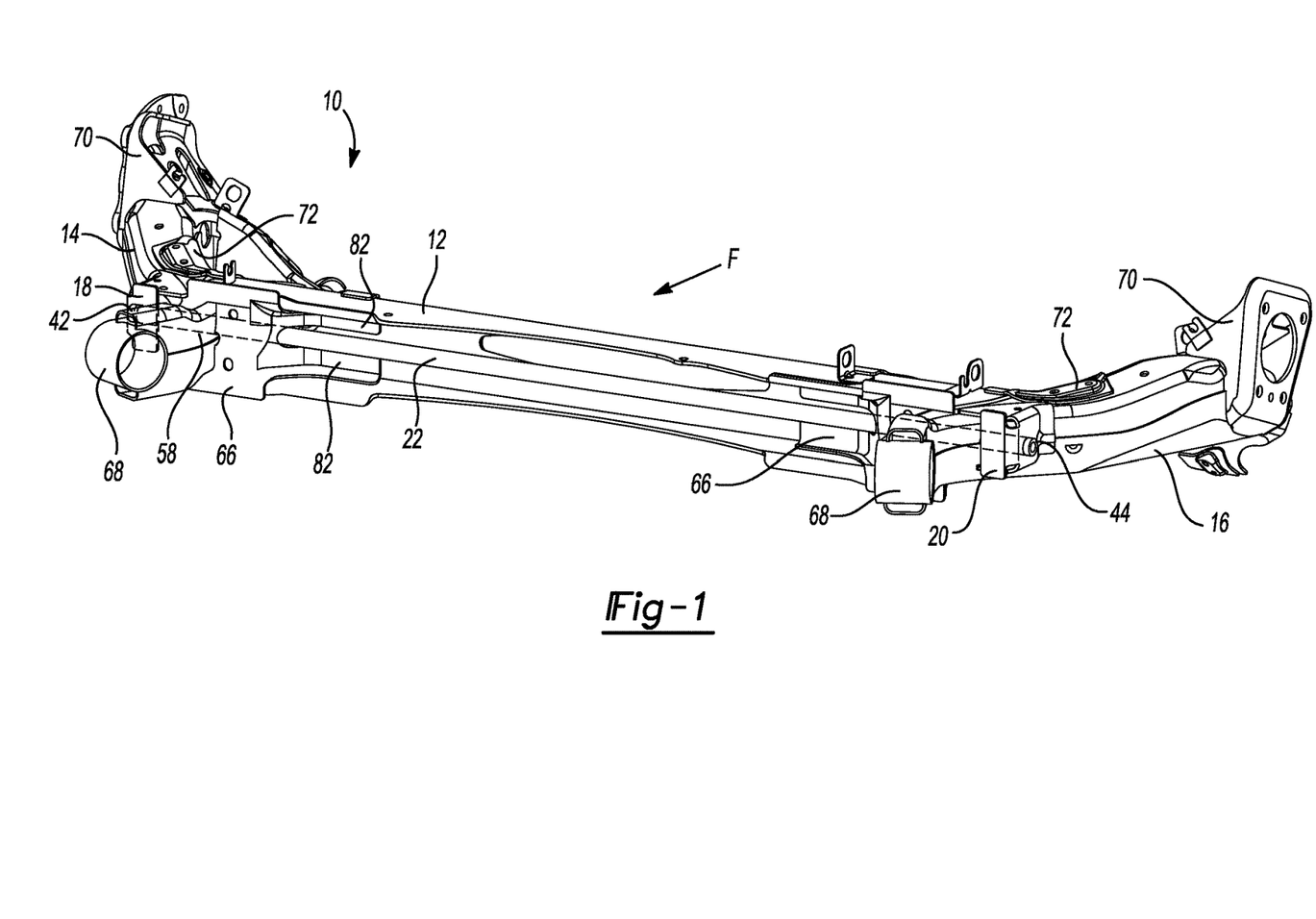
FIG. 1 is a perspective view of an example axle assembly of the present disclosure.
Figure 2:
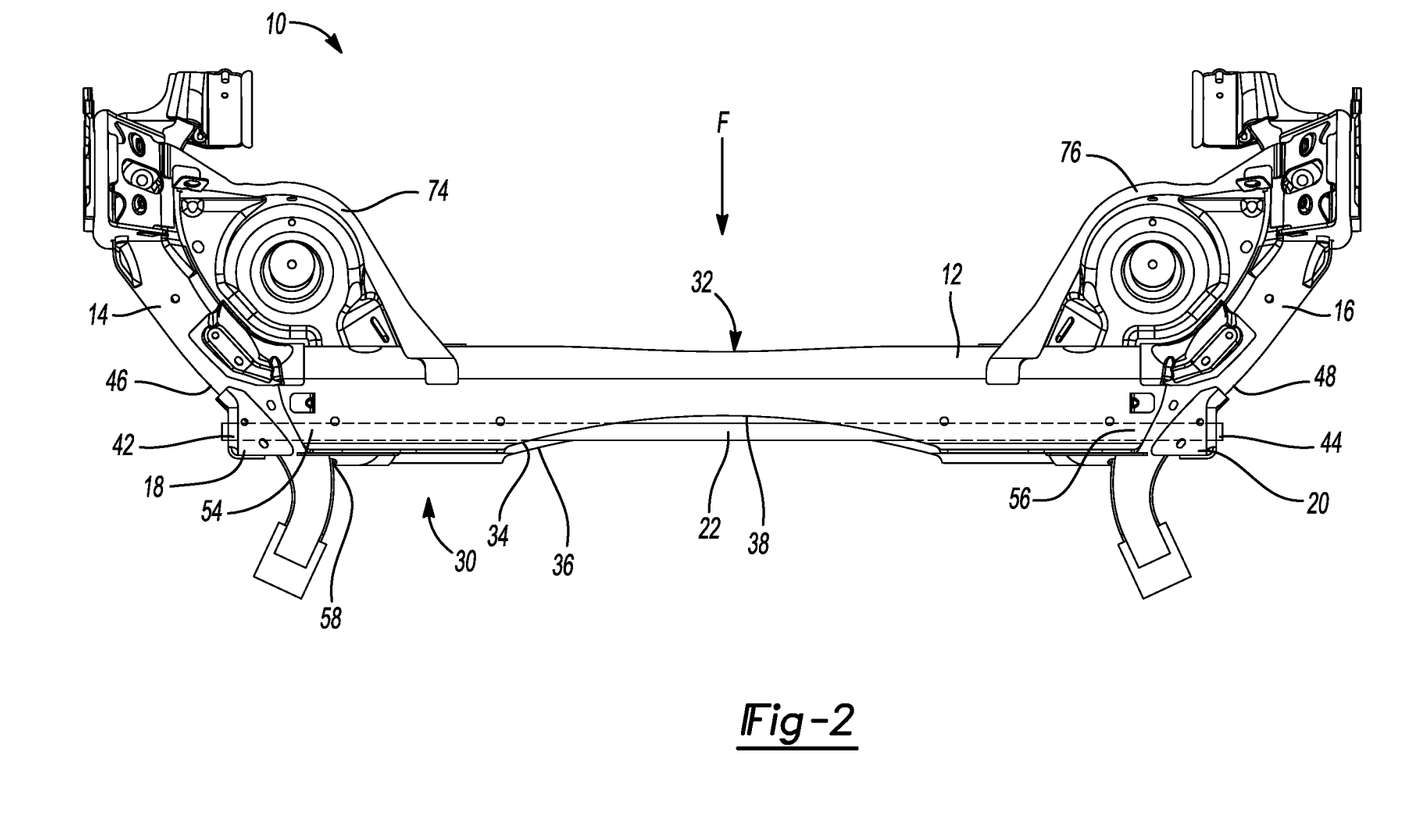
FIG. 2 is a top view of the example axle assembly shown in FIG. 1.

FIGS. 1 and 2 depict one embodiment of an axle assembly 10 of the present disclosure. The embodiment shown is a rear axle assembly for connection to a vehicle intended to travel in a forward direction F as indicated in FIG. 1. The present disclosure and one or more of the elements hereafter described, however, may be used in other orientations and configurations.

In the illustrated embodiment, axle assembly 10 includes twist beam 12, first rail assembly 14, second rail assembly 16, first outrigger 18, second outrigger 20, and torsion bar 22. Axle assembly 10 includes a central transverse member such as twist beam 12 that connects two opposing and substantially symmetrical sides of the assembly. The opposing sides of axle assembly 10 each include one or more additional suspension or related components such as bushing 68, bearing plate assembly 70 and spring seat assembly 74, 76. In the embodiment shown in FIG. 1, axle assembly 10 is in a trailing arm type configuration but other configurations of axle assembly 10 can also be used.

Figure 3:
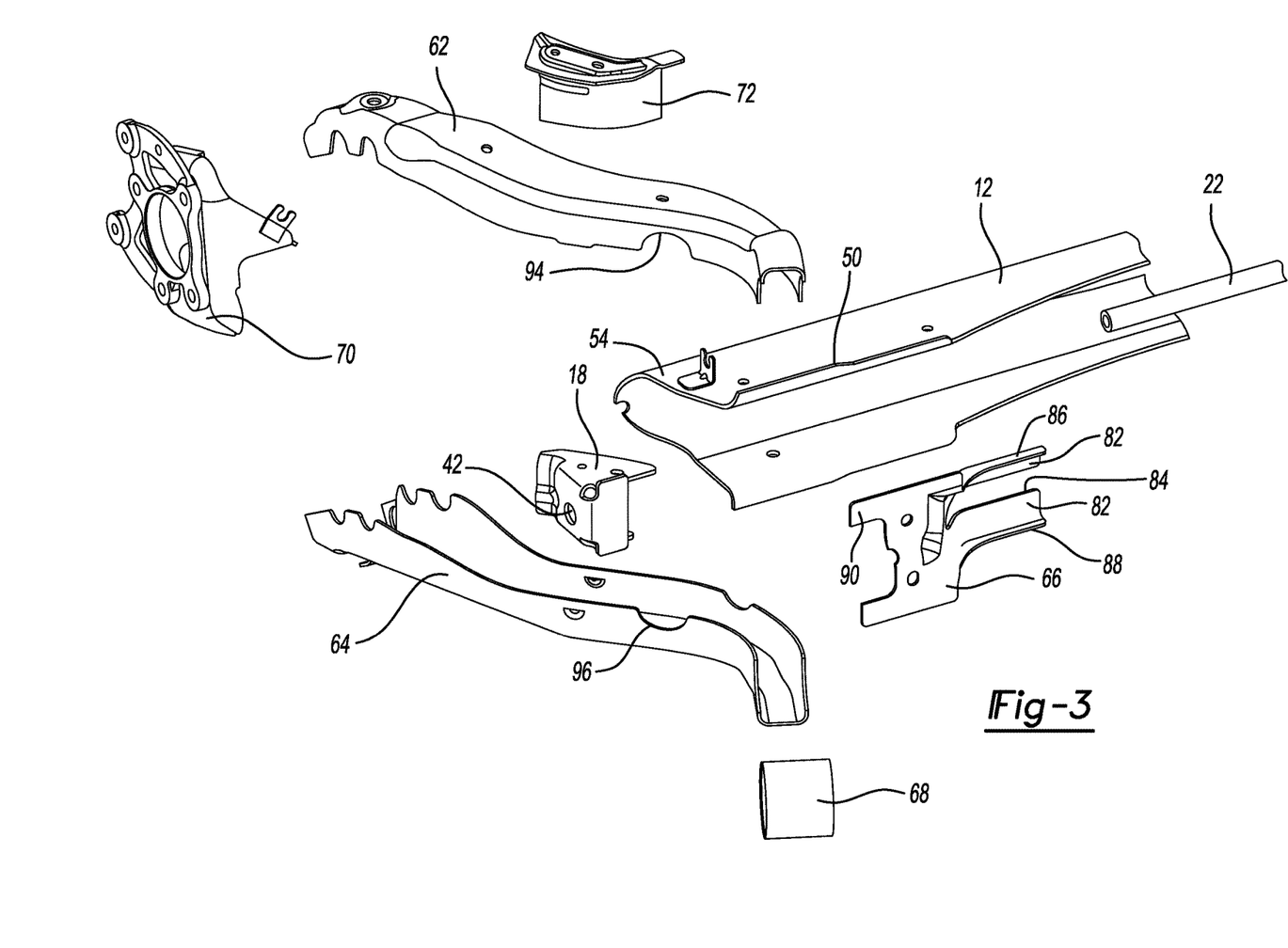
FIG. 3 is an exploded perspective view of one side of the example axle assembly shown in FIG. 1.
Figure 4:
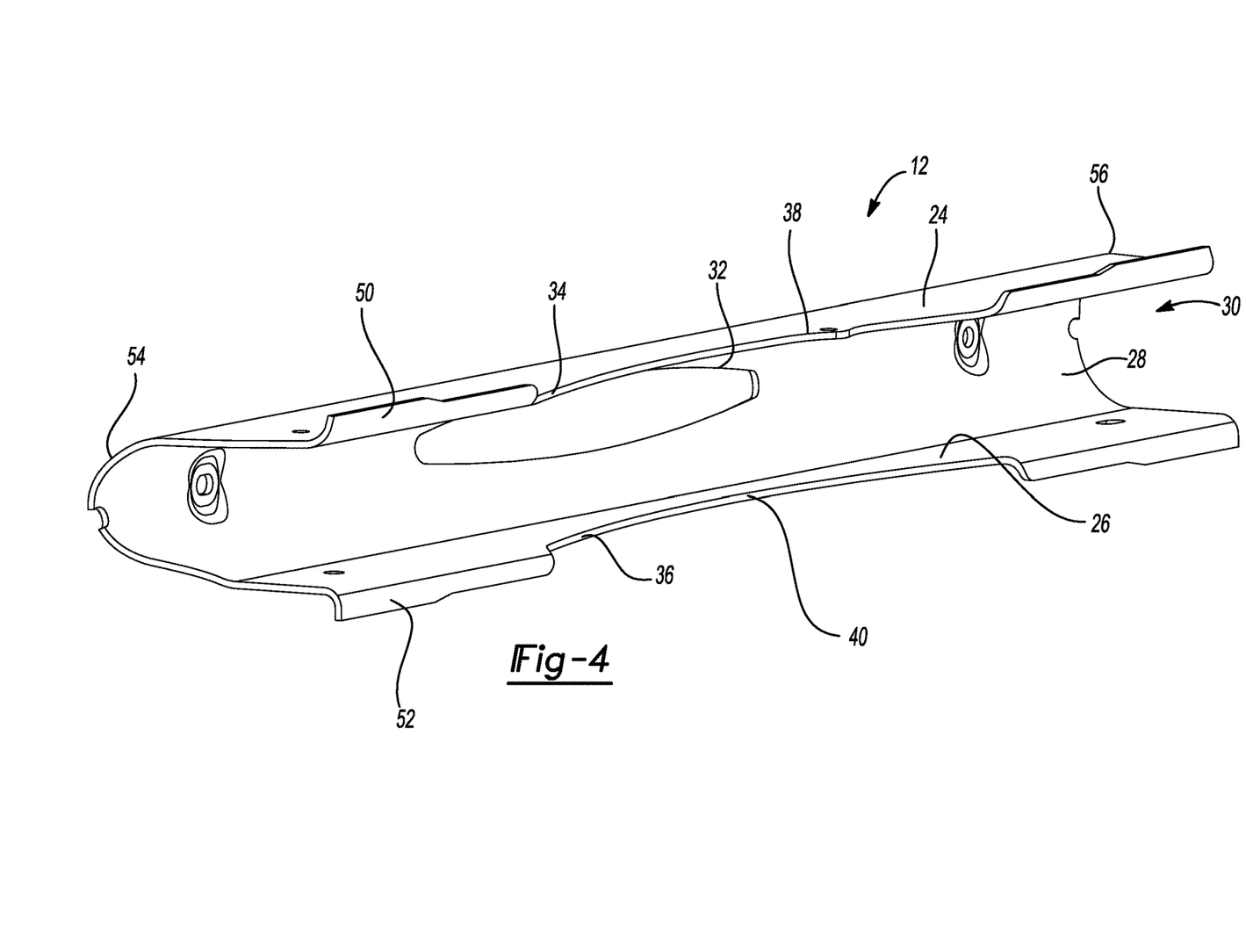
FIG. 4 is a perspective view of an example twist beam of the present disclosure.

As shown in FIGS. 1-3, axle assembly 10 includes twist beam 12. Twist beam 12 is the central transverse member of axle assembly 10 and includes a first end 54 connected to first rail assembly 14 and a second end 56 connected to second rail assembly 16. Twist beam 12 has an open section configuration, that is, it has a cross section that includes open portion 30. To create this open section configuration, which in this example has a C-shape configuration, twist beam 12 has an upper wall 24, a lower wall 26 and a rear wall 28. Upper wall 24 is connected and separated from lower wall 26 by rear wall 28 such that a vertical distance is created between upper wall 24 and lower wall 26 to create open portion 30. While the section of twist beam 12 in this example has a C-shaped open section, other sections of twist beam 12 can also be used to achieve the desired torsional stiffness, a desired location of the shear center of the assembly as well as other desired characteristics.

As further shown in FIG. 3 in this example, twist beam 12 may have a non-uniform cross section along its length. In one example, twist beam 12 includes beam opening 32, upper scallop 38 and lower scallop 40. Beam opening 32 is an opening in rear wall 28. A portion of rear wall 28 can be removed to create beam opening 32. Various shapes of beam opening 32 can be used. In one example, beam opening 32 is generally elliptical in shape with a length along the major axis of the ellipse and a height measured along the minor axis of the ellipse.

Beam opening 32 serves various purposes in the performance and functionality of axle assembly 10. Beam opening 32 reduces the weight of axle assembly 10 as well as creating a pass-through for air or other elements to flow through twist beam 12. As can be appreciated, in the example axle assembly 10 in which open portion 30 of twist beam 12 is forward facing (as shown in FIG. 1), the open section of twist beam 12 would tend to retain debris and air that would enter the open section of twist beam 12. Such a circumstance could cause premature failure of the components and increase the drag of the vehicle to which rear assembly 10 is connected. Beam opening 32 permits air and other debris to exit the open section of twist beam 12 and alleviates the aforementioned disadvantages that may exist if the absence of beam opening 32.

Beam opening 32 also permits a designer of axle assembly 10 to obtain desired structural characteristics of rear axle assembly by varying the size and location of beam opening 32. Such characteristics include a torsional stiffness and a location of the shear center of axle assembly 10.

As previously stated, twist beam 12, in one example, includes upper scallop 38 and lower scallop 40. Twist beam 12 includes an upper forward edge 34 that is the forward edge of upper wall 24. Upper forward edge 34 could follow a generally linear profile. Other profiles can also be used. One such alternate profile is shown in FIG. 2. In this example, upper forward edge 34 includes an arcuate profile at a center location of the edge. The arcuate profile at this portion of upper forward edge 34 defines upper scallop 38. Upper scallop 38 has a length along the transverse direction of twist beam 12 and a depth measured as the perpendicular distance from upper forward edge 34. The length and depth of upper scallop 38 can be varied to obtain desired characteristics of rear axle assembly10. Such characteristics include a torsional stiffness and a location of the shear center of axle assembly 10.

Lower scallop 40 can be of the same size and profile as upper scallop 38. In other examples, lower scallop 40 has a different size or profile from that of upper scallop 38.

Referring back to FIG. 3, twist beam 12 includes upper flange 50 and lower flange 52. In this example, upper flange 50 is a bent portion of upper forward edge 34 that is oriented in a substantially perpendicular position relative to upper wall 24 and is positioned away from open portion 30 of twist beam 12. As further shown in FIG. 3, upper flange 50 has a varied height along the transverse length of upper forward edge 34. In other embodiments, upper flange 50 can have a uniform height and can be oriented in different positions relative to upper wall 24 such as being oriented at an oblique angle relative upper wall 24 or being bent inwardly such that upper flange 50 extends into the region between upper wall 24 and lower wall 26. As further shown, twist beam 12 also includes lower flange 52. In this example, lower flange 52 is symmetrical to upper flange 50. In other examples, lower flange has a different shape, size and orientation from that of upper flange 50.

As shown in the example of FIGS. 1 and 2, axle assembly 10 may also include one or more reinforcing members. One such reinforcing member is beam reinforcement 66. Beam reinforcement 66 is a reinforcement that is connected to and fit within twist beam 12. As shown in FIGS. 1 and 3, beam reinforcement 66, in this example, fits within twist beam 12 at a location at or near the ends of twist beam 12 where twist beam 12 is joined to first rail assembly 14 and second rail assembly 16. As further shown, beam reinforcement 66 includes one or more fingers 82 and an elongated notch 84 that provides clearance for torsion bar 22 that extends within open portion 30 of twist beam 12. Beam reinforcement 66 is joined to an inner surface of twist beam 12 at upper connecting wall 86 and lower connecting wall 88. Beam reinforcement 66 may also be joined to twist beam 12 at upper and lower portions of bridge wall 90. Bridge wall 90 is connected to and spans open portion 30 of twist beam 12 between upper flange 50 and lower flange 52. Other shapes and configurations of reinforcing elements may also be used.

Axle assembly 10 also includes torsion bar 22. Torsion bar 22 is a cylindrically-shaped elongated member extending laterally across axle assembly 10. As can be seen in FIG. 1, torsion bar 22 is positioned between upper wall 24 and lower wall 26 such that torsion bar 22 resides in open portion 30 of twist beam 12. As will be further explained, torsion bar 22 is connected to rail assembly 10 at first bar attachment point 42 of first outrigger 18 and at second bar attachment point 44 of second outrigger 20. In this position, torsion bar 22 extends laterally beyond first end 54 and second end 56 of twist beam 12. More particularly, torsion bar 22 extends beyond first end 54 and second end 56, through first rail assembly 14 and second rail assembly 16, through first outrigger 18 and second outrigger 20 and is connected at first bar attachment point 42 and second bar attachment point 44.

Referring back to FIG. 2, twist beam 12 is connected at first end 54 to first rail assembly 14 and at second end 56 to second rail assembly 16. In this example, first rail assembly 14 and second rail assembly 16 are substantially symmetrical to one another. FIG. 3 illustrates an exploded view of one side of an example axle assembly 10 and shows first rail portion 62 and second rail portion 64 that are connected to one another to create first rail assembly 14. In this example, first rail portion 62 is an upper member with a general s-shaped profile. First rail portion 62 is joined to second rail portion 64 to create a closed section member of first rail assembly 14. First rail portion 62 and second rail portion 64 can be configured such that first rail portion 62 can nest inside second rail portion 64. In other embodiments, the opposite configuration can be used.

As further shown in FIG. 3, first rail portion 62 includes first rail relief 94. First rail relief 94 is a rounded feature along an edge of first rail portion 62. Second rail portion 64 includes complimentary feature second rail relief 96. Second rail relief 96 is also a rounded feature along an edge of second rail portion 64 and serves to compliment first rail relief 94. As can be appreciated, when first rail portion 62 is joined to second rail portion 64, first rail relief 94 and second rail relief 96 are positioned such that an opening is created in first lateral outer wall 46 of first rail assembly 14. First rail assembly 14 and second rail assembly 16 can also include similar features to create an opening on inner lateral wall 58. These openings permit torsion bar 22 to extend through first rail assembly 14 and second rail assembly 16.

As further shown in FIG. 2, twist beam 12, when joined to first rail assembly 14 and second rail assembly 16, creates a structure whereby other elements of axle assembly 10 can be connected to twist beam 12 and/or a trailing portion of first rail assembly 14 such as bearing plate assembly 70 or first spring seat assembly 74. Axle assembly 10 may also include rail reinforcement 72. Rail reinforcement 72 is connected at or near the intersection of twist beam 12 to first rail assembly 14. Other reinforcements may also be added to first rail assembly 14 or second rail assembly 16.

As further shown in FIGS. 1 and 2, first outrigger 18 is also joined to first rail assembly 14. As previously described, torsion bar 22 is connected to axle assembly 10 at first bar attachment point 42 located on first outrigger 18 and at second bar attachment point 44 located on second outrigger 20. First outrigger 18 is joined to rail assembly 14 at a location transversely outboard of first end 54 of twist beam 12. Twist beam 12 is connected to an inner lateral wall 58 of rail assembly 14 and first outrigger 18 is connected to an opposing outer lateral wall 46 of rail assembly 14. In this manner, torsion bar 22 extends laterally inside the open portion 30 of twist beam 12, through the first and second rail assemblies 14, 16, through first and second outriggers 18, 20 and is connected to axle assembly 10 at the first and second bar attachment points 42, 44 on first and second outriggers 18, 20, respectively.

Figure 5:
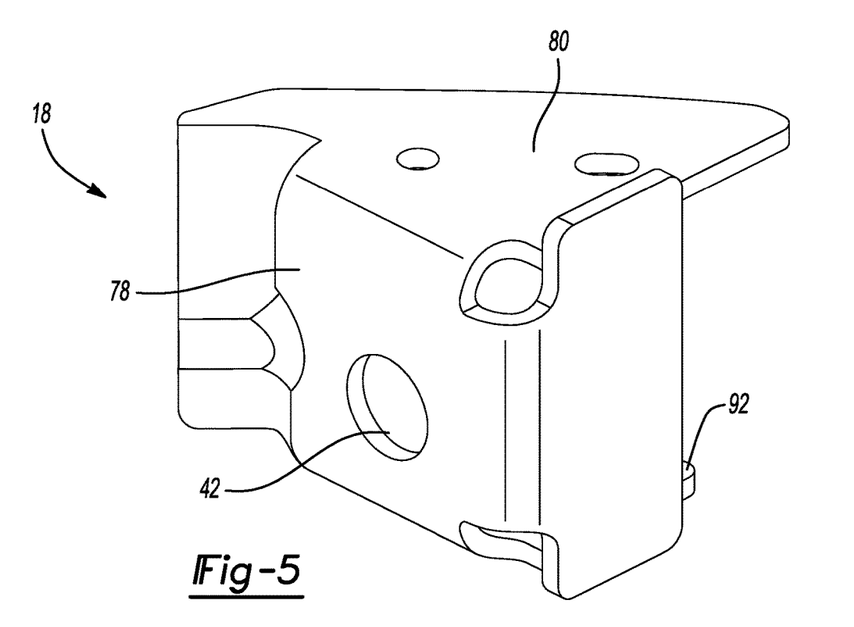
FIG. 5 is a perspective view of an example outrigger of the present disclosure.

FIG. 5 illustrates one example of first outrigger 18 of the present disclosure. Second outrigger 20 can be symmetrically configured to first outrigger 18. In other embodiments, first and second outriggers could have differences in order to accommodate, for example, differences between first rail assembly 14 and second rail assembly 16 or to incorporate different features or reliefs to address packaging requirements. In the example shown in FIG. 5, first outrigger 18 includes bar attachment wall 78, rail attachment wall 80 and first bar attachment point 42. Torsion bar 22 is connected to first outrigger 18 at bar attachment wall 78. As can be appreciated, bar attachment wall 78, in this example, is oriented substantially perpendicular to a central axis 60 of torsion bar 22 and includes bar attachment point 42. In this configuration, torsion bar 22 can extend through bar attachment point 42 in bar attachment wall 78 and be joined to first outrigger 18.

As noted, first outrigger 18 also includes rail attachment wall 80. Rail attachment wall 80 is substantially triangular in shape in this example and the angled edge of rail attachment wall 80 generally follows the contour of the lateral outer wall of first rail assembly 14 at which first outrigger 18 is positioned. In this manner, when rail attachment wall 80 is connected to first rail assembly 14 at one or more attachment locations, including at attachment A, bar attachment wall 78 is oriented substantially perpendicularly to the central axis of torsion bar 22 as previously described. First outrigger 18 also includes a second rail attachment wall 92 that is oriented substantially parallel to first rail attachment wall 80.

The foregoing example structure of axle assembly 10 is used to design and manufacture an axle assembly that produces desired ride, handling and durability specifications of a vehicle. Such desirable ride, handling and durability specifications are obtained by tuning the structural characteristics of the axle assembly. Two such significant characteristics of axle assemblies are the torsional stiffness and the position of the shear center. It is also important to assure a minimum fatigue life of the various components of the axle assembly.

Figure 11:
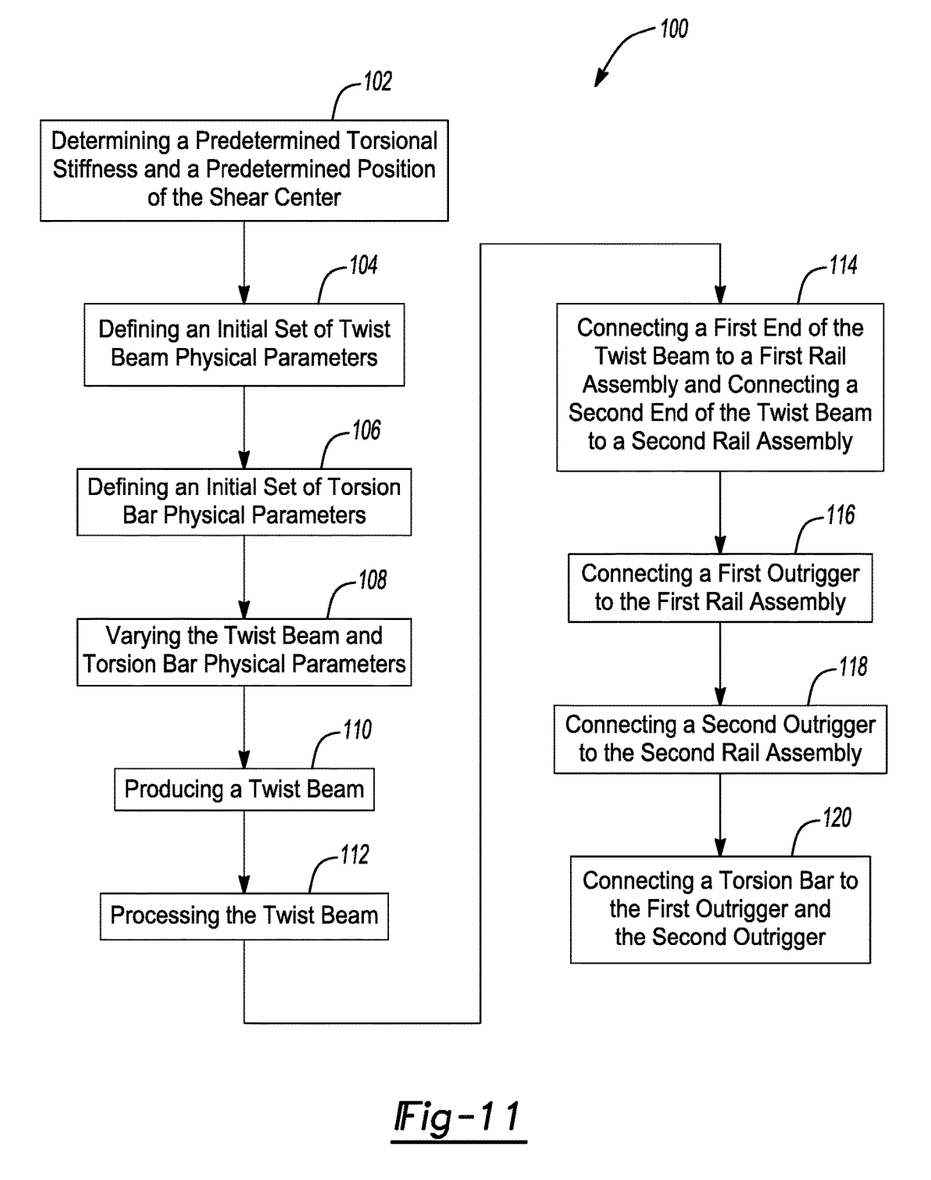
FIG. 11 is a process flow diagram of one example method of the present disclosure.

The present disclosure contemplates a method of producing an axle assembly. One example method is illustrated in FIG. 11. The method can include design and/or manufacturing steps. Such a process of designing or manufacturing an axle assembly of the present disclosure can begin at step 102 with the step of determining a desired torsional stiffness and a desired position of the shear center of the axle assembly. With these desired characteristics or predetermined characteristics, the design and manufacture of the axle assembly can continue. At step 104, an initial set of twist beam physical parameters are defined. The designer defines an initial set of twist beam physical parameters by choosing various physical characteristics of twist beam 12. Twist beam physical parameters can include material, thickness, length, cross-section as well as the size and shape of the previously described features of twist beam 12 such as beam opening 32, upper scallop 38, lower scallop 40, upper flange 50 and lower flange 52.

Figure 6:
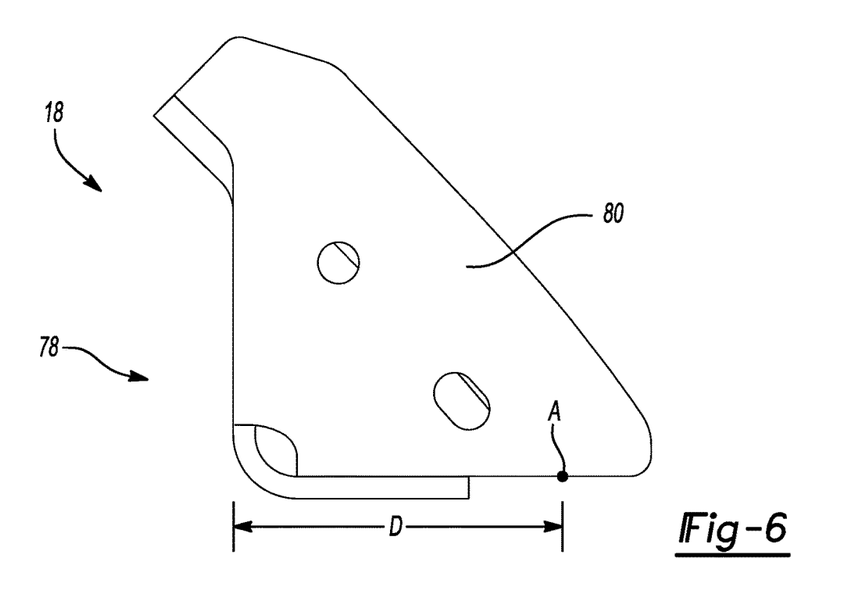
FIG. 6 is a top view of the outrigger of FIG. 5.
Figure 7:
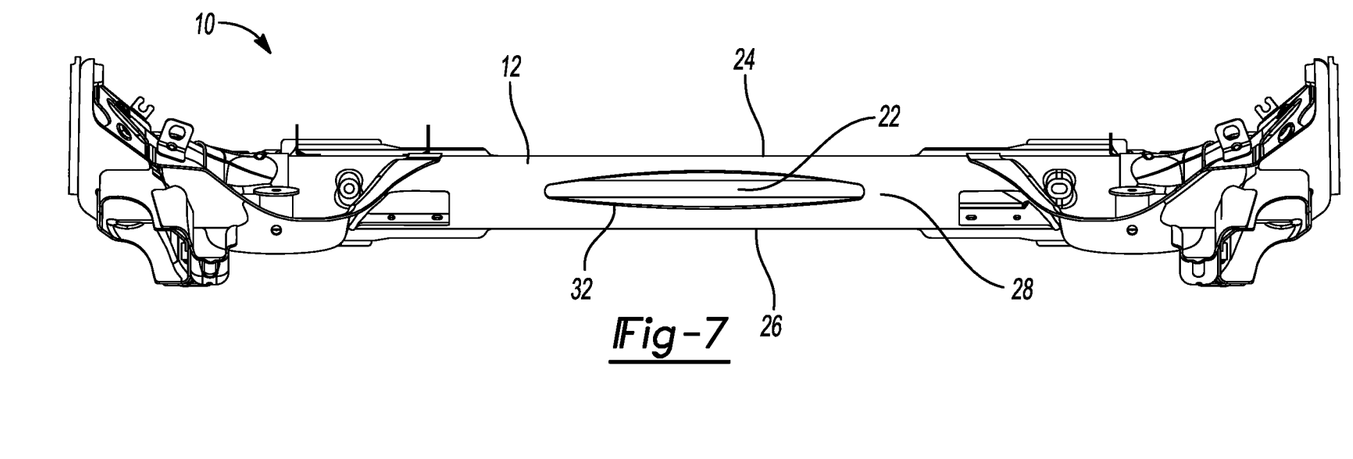
FIG. 7 is a rear view of the example axle assembly shown in FIG. 1.
Figure 8:
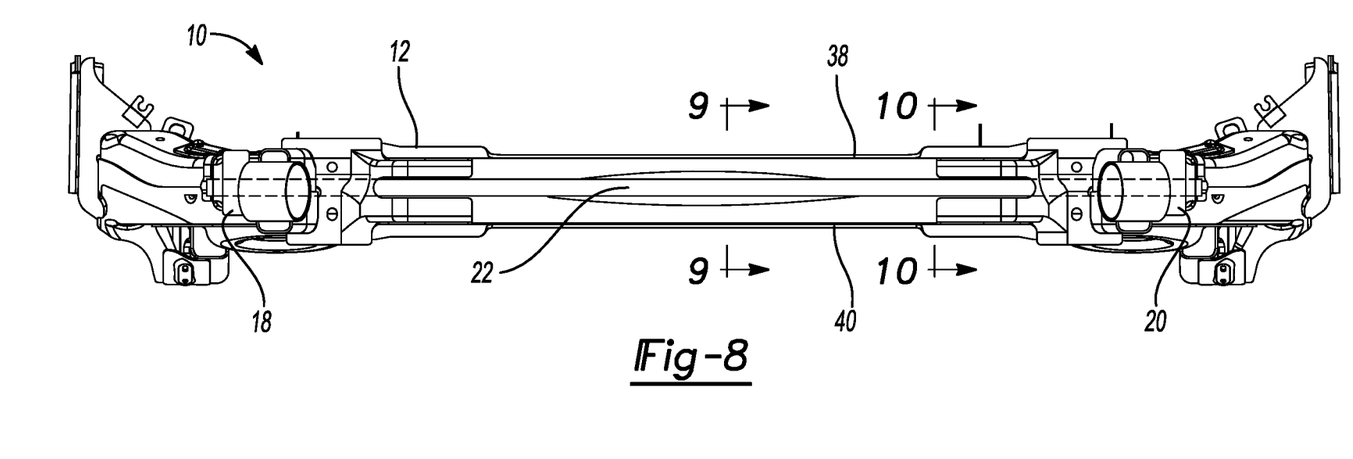
FIG. 8 is a front view of the example axle assembly shown in FIG. 1.

At step 106, an initial set of torsion bar physical parameters are defined. The designer defines an initial set of torsion bar physical parameters by choosing various physical characteristics of torsion bar 22 and its relationship to other components of axle assembly 10. Torsion bar physical parameters can include an inner diameter, an outer diameter, material, length, position of first bar attachment point 42 and position of second bar attachment point 44. Physical parameters of first outrigger 18 and second outrigger 20 may also be defined. The distance D, as shown in FIG. 6, can be defined at this step and is an important parameter because this distance affects the overall length of torsion bar 22.

Figures 9, 10:
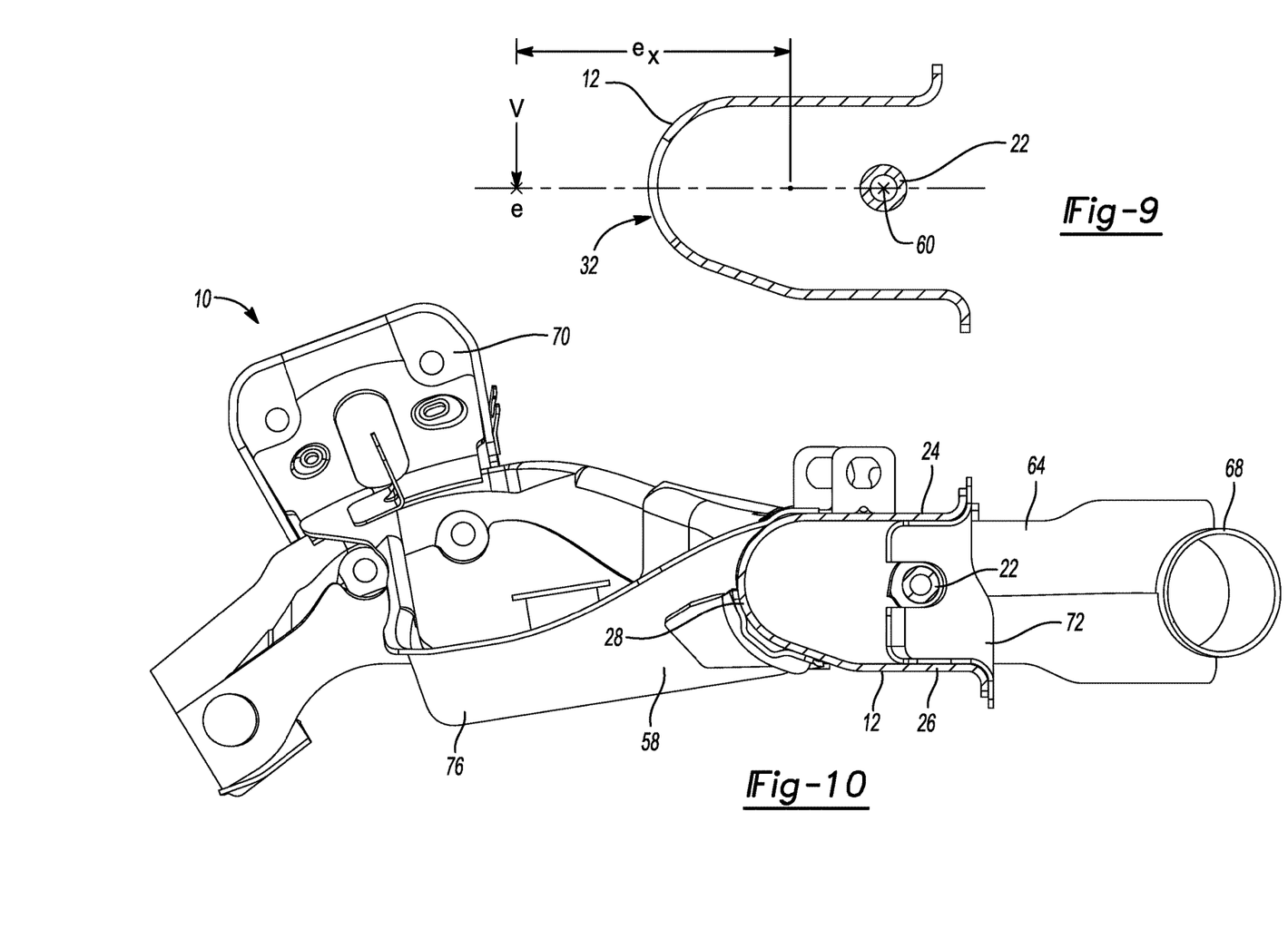
FIG. 9 is sectional illustration of an example twist beam and torsion bar of the present disclosure.
FIG. 10 is a sectional view of the example axle assembly as indicated in FIG. 8.

The physical parameters of twist beam 12 and torsion bar 22 are defined with the intended result of achieving the predefined torsional stiffness and predefined position of a shear center. Shear center relates to the issue of the C-shaped twist beam ends rotating relative to one another based on a vertical load V being applied. When a load V is applied to a beam with a forward-facing open cross-section, the load can cause twisting to occur in addition to bending of the beam. When a vertical load V is applied at the shear center, no such twisting results and only simple bending occurs. As depicted in FIG. 9, the shear center e of the example C-channel cross-section is positioned at a distance $e_x$ from the centroid of beam 12. Because suspension inputs will vary based on the position of shear center e, it may be desirable to vary the geometry of axle assembly 10 to obtain a desired shear center position. One such way of varying the geometry of axle assembly 10 is by varying the physical parameters of twist beam 12 and torsion bar 22.

At step 108, the twist beam and torsion bar physical parameters are varied to achieve the predetermined torsional stiffness and the predetermined position of the shear center of the axle assembly and obtain optimized twist beam physical parameters and optimized torsion bar physical parameters. This can be an iterative process. Various engineering tools, such as CAE modeling tools, can be used during this step to achieve the desired result. The previously described twist beam physical parameters and torsion bar physical parameters can be varied in the tools and modeled in order to tune the design of axle assembly 10. For example, various cross-sections, different materials and other various aspects of the geometry of axle assembly 10 can be varied until the engineering tools indicate that the predetermined torsional stiffness and the predetermined position of the shear center are achieved. The physical parameters that result in axle assembly 10 achieving the predetermined torsional stiff and the predetermined position of the shear center are considered the optimized twist beam physical parameters and the optimized torsion bar physical parameters.

The method continues with steps that include the manufacturing of the physical axle assembly that achieves the aforementioned predetermined torsional stiffness and the predetermined position of the shear center. At step 110, a twist beam 12 is produced. Twist beam 12 in this step may be produced using various manufacturing methods. One example process is roll-forming. Twist beam 12 can be roll-formed according to one or more aspects of the optimized twist beam physical parameters such as an optimized material and an optimized cross-section.

Further processing of twist beam 12 occurs at step 112. At this step, various other aspects of the optimized twist beam physical parameters are incorporated into twist beam 12. Twist beam 12 can be cut to an optimized length and beam opening 32 can be added, for example. Further processing may additionally occur, such as the addition of upper scallop 38 and lower scallop 40. At the conclusion of this step, a twist beam 12 with the optimized twist beam physical parameters has been created.

At step 114, first end 54 of twist beam 12 including the optimized twist beam physical parameters is connected to first rail assembly 14 and second end 56 of twist beam 12 is connected to second rail assembly 16. As previously described, first end 56 of twist beam 12 is connected to first rail assembly 16 at lateral inner wall 58. As can be appreciated, second end 56 is similarly connected to second rail assembly 16.

At steps 116 and 118, first outrigger 18 is connected to first rail assembly 14 and second outrigger is connected to second rail assembly 16, respectively. First outrigger 18 is connected to first rail assembly 14 at a location transversely outboard of first end 54 of twist beam 12. Second outrigger is symmetrically connected to second rail assembly 16.

At step 120, torsion bar 22 is connected to first outrigger 18 and second outrigger 20. When connected at step 120, torsion bar 22 includes the optimized torsion bar physical properties that were previously determined. As a result of aforementioned steps, an axle assembly 10 is produced that achieves the predetermined torsional stiffness and the predetermined position of the shear center.

Further processing may occur to axle assembly 10. Such further processing may include, for example, the addition of other previously described reinforcements or other components of axle assembly 10 or may include finishing processes of the axle assembly.

The previously described method of producing an axle assembly with a predetermined torsional stiffness and a predetermined position of the shear center can be advantageously used to overcome disadvantages of existing methodologies and existing axle assemblies. The example method contemplates that various aspects of axle assembly 10 can be easily varied, tuned and scaled to quickly and inexpensively change the ride, handling and durability characteristics of axle assembly 10.

For example and as previously described, twist beam 12 can be roll formed with a uniform cross section before post-processing occurs. This method of manufacture permits twist beam 12 to be manufactured at low cost and permits the easy scaling of axle assembly 10 since various lengths of twist beam 12 can be cut from a roll formed beam blank. The aforementioned post-processing steps of cutting or otherwise removing material from a roll-formed twist beam blank to create beam opening 32, upper scallop 38, lower scallop 40, upper flange 50 or lower flange 52 are relatively inexpensive and can be changed during the product development process or during fine-tuning of the dynamics of the axle assembly without the need to change entire dies that are often used in existing formed twist beams.

Similar advantages exist with respect to other characteristics and elements of axle assembly 10. The physical parameters of torsion bar 22 and the geometry of first outrigger 18 and second outrigger 20 are further examples of aspects of axle assembly 10 that enable the axle assembly to be quickly and inexpensively revised, tuned and scaled. For example, the length of torsion bar 22 and the location of the first bar attachment point 42 and the second bar attachment point 44 are aspects advantageously suited for such revision, tuning and scalability. As shown in FIG. 6, first outrigger 18 includes a distance D that is the distance from a forward attachment location A of first outrigger 18 to bar attachment wall 78. This distance D can be varied on first outrigger 18 (and correspondingly on second outrigger 20) to change the span of torsion bar 22 between its two connection points to axle assembly 10. For example, as distance D is increased on first outrigger 18, so too is the overall length of torsion bar 22 increased. This in turn, changes the torsional characteristics of axle assembly 10 and is a relatively inexpensive method of revising the torsional characteristics of axle assembly 10 since only a revision to first outrigger 18 and second outrigger 20 is required.

Similar advantages result from the previously described structure of torsion bar 22. During the product development process or during fine-tuning of the dynamics of a vehicle, the size and length of torsion bar 22 can be relatively easily changed without the need for expensive retooling of entire beam dies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
 a first rail assembly;
 a second rail assembly;
 an open-section twist beam including an upper wall, a lower wall and a rear wall, the upper wall connected to the lower wall by the rear wall such that the upper wall and the lower wall are separated by a distance to define an open portion of the twist beam, the twist beam connected at a first end to the first rail assembly and at a second end to the second rail assembly such that the open portion is substantially forward facing;
 a first outrigger connected to the first rail assembly on a first lateral outer wall of the first rail assembly and transversely outboard of the first end of the twist beam;
 a second outrigger connected to the second rail assembly on a second lateral outer wall of the second rail assembly and transversely outboard of the second end of the twist beam; and
 a torsion bar extending through and connected to the first outrigger at a first bar attachment point and extending through and connected to the second outrigger at a second bar attachment point such that it extends transversely within the open portion of the twist beam.

2. The axle assembly of claim 1, wherein the rear wall of the twist beam includes a beam opening located opposite the open portion to create a pass-through from the open portion through the beam opening in the rear wall.

3. The axle assembly of claim 1, wherein the upper wall has a transversely extending upper forward edge, the upper forward edge having an arcuate shape along a portion thereof to define an upper scallop in the upper wall.

4. The axle assembly of claim 1, wherein the lower wall has a transversely extending lower forward edge, the lower forward edge having an arcuate shape along a portion thereof to define a lower scallop in the lower wall.

5. The axle assembly of claim 1, wherein the twist beam is roll-formed with a C-channel configuration.

6. The axle assembly of claim 1, wherein the first bar attachment point is positioned at a transverse distance from the first end of the twist beam and at a depth relative to the rear wall to obtain a predetermined torsional stiffness and a predetermined position of the shear center of the axle assembly.

7. The axle assembly of claim 4, wherein a length and a width of the lower scallop are chosen to obtain a predetermined torsional stiffness and a predetermined position of a shear center of the axle assembly.

8. The axle assembly of claim 1, wherein the torsion bar has an annular cross-section with an inner diameter and an outer diameter, wherein a predetermined torsional stiffness or a predetermined position of a shear center of the axle assembly are obtained based on the inner diameter and the outer diameter.

9. The axle assembly of claim 1, wherein the torsion bar extends through the first rail assembly transversely inboard of the first bar attachment point.

10. An axle assembly for a vehicle operable to travel in a forward direction, comprising:
    a twist beam having a C-shaped cross section, the twist beam including an upper wall, a lower wall and a rear wall, the rear wall connecting the lower wall to the upper wall such that the upper wall and the lower wall are separated by a distance to define an open portion of the twist beam, wherein the twist beam is configured to be connected to the vehicle such that the open portion is forward facing; and
    a torsion bar having ends fixed relative to the twist beam, the torsion bar transversely extending through the open portion of the twist beam.

11. The axle assembly of claim 10, further comprising a pass-through created by a beam opening in the rear wall, the beam opening positioned opposite the open portion such that air is permitted to flow from the open portion through the beam opening when the axle assembly is in motion.

12. The axle assembly of claim 10, wherein the upper wall has a transversely extending upper forward edge, the upper forward edge having an arcuate shape along a portion thereof to define an upper scallop in the upper wall.

13. The axle assembly of claim 10, wherein the lower wall has a transversely extending lower forward edge, the lower forward edge having an arcuate shape along a portion thereof to define a lower scallop in the lower wall.

14. The axle assembly of claim 10, having a first end and a second end, wherein the first end is configured to be connected to a first rail assembly of the axle assembly and the second end is configured to be connected to a second rail assembly of the axle assembly.

15. A method of producing an axle assembly with a predetermined torsional stiffness and a predetermined position of a shear center, comprising:
    defining an initial set of twist beam physical parameters;
    defining an initial set of torsion bar physical parameters;
    varying the initial set of twist beam physical parameters and the initial set of torsion bar physical parameters to achieve the predetermined torsional stiffness and the predetermined position of the shear center of the axle assembly and obtain optimized twist beam physical parameters and optimized torsion bar physical parameters;
    connecting a first end of a twist beam including the optimized twist beam physical parameters to a first rail assembly and connecting a second end of the twist beam to a second rail assembly, wherein the twist beam includes an upper wall and a lower wall connected to and separated by a rear wall to create an open portion between the upper wall and the lower wall;
    connecting a first outrigger to the first rail assembly transversely outboard of the first end of the twist beam on a lateral outer wall of the first rail assembly;
    connecting a second outrigger to the second rail assembly transversely outboard of the second end of the twist beam on a lateral outer wall of the second rail assembly; and
    connecting a torsion bar including the optimized torsion bar physical parameters to the first outrigger and the second outrigger such that the torsion bar spans a transverse distance between the first outrigger and the second outrigger and is positioned between the upper wall and the lower wall of the twist beam at a desired location to achieve the predetermined torsional stiffness and the predetermined position of the shear center of the axle assembly.

16. The method of claim 15, further comprising removing a portion of the upper wall of the twist beam such that a forward edge of the upper wall has an upper arcuate shape along a portion of the forward edge between the first end and the second end of the twist beam, wherein an upper length and an upper width of the upper arcuate shape are chosen to obtain the predetermined torsional stiffness and the predetermined position of the shear center of the axle assembly.

17. The method of claim 15, further comprising removing a portion of the lower wall of the twist beam such that a forward edge of the lower wall has a lower arcuate shape along a portion of the forward edge between the first end and the second end of the twist beam, wherein a lower length and a lower width of the lower arcuate shape are chosen to obtain the predetermined torsional stiffness and the predetermined position of the shear center of the axle assembly.

18. The method of claim 15, wherein during the step of connecting the first outrigger to the first rail assembly, the first outrigger includes a first bar attachment point at which the torsion bar is connected to the first outrigger, the first bar attachment point positioned relative to the twist beam to obtain the predetermined torsional stiffness and the predetermined position of the shear center of the axle assembly.

19. The method of claim 15, further comprising removing a portion of the rear wall of the twist beam to create a pass-through opposite the open portion.

20. The method of claim 15, further comprising roll forming the twist beam in a C-shaped cross-section.

* * * * *